United States Patent
Wei et al.

(10) Patent No.: US 9,288,168 B2
(45) Date of Patent: Mar. 15, 2016

(54) RETRIEVING MESSAGES IN ORDER IN A DISTRIBUTED PUBLISH/SUBSCRIBE SYSTEM

(71) Applicant: INTERNATIONAL BUSINESS MACHINES CORPORATION, Armonk, NY (US)

(72) Inventors: Jia R. Wei, Beijing (CN); Jing G. Zhang, Beijing (CN); Jun J. Zhang, Sammamish, WA (US); Kai Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 14/224,307

(22) Filed: Mar. 25, 2014

(65) Prior Publication Data

US 2014/0297769 A1  Oct. 2, 2014

(30) Foreign Application Priority Data

Mar. 29, 2013  (CN) .......................... 2013 1 0109002

(51) Int. Cl.
H04L 12/58  (2006.01)
(52) U.S. Cl.
CPC ...................... H04L 51/04 (2013.01)
(58) Field of Classification Search
USPC .................. 709/201–206, 228, 233, 207, 232
See application file for complete search history.

(56) References Cited

U.S. PATENT DOCUMENTS

| 6,226,510 | B1* | 5/2001 | Boling ................... G08B 7/064 340/574 |
| 8,135,594 | B2 | 3/2012 | Beardall et al. |
| 8,140,630 | B2 | 3/2012 | Jones et al. |
| 2002/0143710 | A1* | 10/2002 | Liu ......................... G06Q 20/02 705/75 |
| 2005/0198170 | A1* | 9/2005 | LeMay ................... H04L 12/58 709/206 |
| 2007/0287483 | A1* | 12/2007 | Park ..................... G06Q 10/107 455/466 |
| 2009/0138572 | A1 | 5/2009 | Banks et al. |
| 2010/0131600 | A1* | 5/2010 | Manikeyashetty ...... G06F 9/546 709/206 |

(Continued)

FOREIGN PATENT DOCUMENTS

WO  2012055111 A1  5/2012

OTHER PUBLICATIONS

C. Lumezanu et al., "Decentralized Message Ordering for Publish/Subscribe System", ACM, Proceedings of the ACM/IFIP/USENIX 2006 International Conference on Middleware, 2006, pp. 162-179.

(Continued)

*Primary Examiner* — Jude Jean Gilles
(74) *Attorney, Agent, or Firm* — Law Office of Jim Boice (57) ABSTRACT

A method retrieves in order a plurality of specific topic-based messages in a distributed publish/subscribe system, the distributed publish/subscribe system comprising at least one message transit server, the method comprising: determining an order of a plurality of to-be retrieved messages; recording, in message transit server sequence information, message transit servers where the plurality of messages are located, respectively, an order of the message transit servers in the message transit server sequence information corresponding to the determined order of the plurality of messages; and retrieving in order the plurality of messages from corresponding message transit servers using the message transit server sequence information.

20 Claims, 5 Drawing Sheets

(56) References Cited

U.S. PATENT DOCUMENTS

2010/0333111 A1    12/2010   Kothamasu et al.
2012/0047563 A1*    2/2012   Wheeler .............. G06F 21/335
                                                         726/6

OTHER PUBLICATIONS

A. Gaddah, "A Pro-Active Mobility Management Scheme for Publish/Subscribe Middleware Systems", Thesis, Carleton University, Ottawa, Ontario, Canada, Dec. 2008, pp. 1-179.

G. Chockler et al., "Spidercast: A Scalable Interest-Aware Overlay for Topic-Based Pub/Sub Communication", ACM, Proceedings of the 2007 Inaugural Conference on Distributed Event-Based Systems, 2007, pp. 14-25.

T. Milo et al., "Boosing Topic Based Publish/Subscribe Systems With Dynamic Clustering", ACM, Proceedings of the 2007 ACM SIGMOD International Conference on Management of Data, 2007, pp. 749-760.

R. Baldoni et al., "Chapter 1: Distributed Event Routing in Publish/Subscribe Communication Systems", University of Rome, 2005, pp. 1-34.

* cited by examiner

RETRIEVING MESSAGES IN ORDER IN A DISTRIBUTED PUBLISH/SUBSCRIBE SYSTEM

BACKGROUND

The present invention relates to a publish/subscribe (Pub/Sub) system in a computer network environment, and more specifically, to a method and system for retrieving messages in order in a publish/subscribe system in a distributed computer network environment.

Nowadays message publish/subscribe systems have become one of important ways for computer network users to retrieve network information. In a publish/subscribe system, subscribers select message sources of interest according to their own demands. Once a publisher publishes a message, the message would be retrieved by subscribers.

With the wide application of the distributed computer network environment, current publish/subscribe systems mainly employ two modes: a mode of pushing messages proactively and a mode of subscribers retrieving messages proactively. In the mode of pushing messages proactively, messages published by a publisher are sent to a plurality of distributed message transit servers (the publisher has no idea as to each message is sent to which specific transit server), and then the message transit servers push the messages to subscribers; this mode is highly demanding on message transit servers. In the mode of subscribers retrieving messages proactively, message transit servers are not responsible for pushing messages, but subscribers proactively retrieve from the message transit servers the messages to which they have subscribed; this mode may reduce resource consumption at the server side.

Messages published in publish/subscribe systems are subjected to order requirements. For example, regarding message publish/subscribe systems of real-time stock quotations, it should be ensured that messages received by subscribers are in strict time order. For another example, in message publish/subscribe systems of football match live broadcasts, receipt of messages should also be in strict time order. As a plurality of publishers might exist, it cannot be ensured that these publishers coordinately publish messages in strict order; further, it cannot be ensured that messages first published first arrive at message transit servers; thus, it is possible that messages with later timestamps first arrive at subscribers.

For publish/subscribe systems in the mode of pushing messages proactively, timestamps of publishing messages may be set in message transit servers, and the message transit servers push messages to subscribers in correct order. In this case, however, there is a heavy dependence on message transit servers; that is, not only the server side needs to understand order requirements as agreed upon between publishers and subscribers, but also messages distributed on multiple distributed servers need to be ordered and proactively pushed to thousands of subscribers. In the meanwhile, even if messages are pushed in correct order, it still cannot be ensured that subscribers receive all messages in correct order.

In publish/subscribe systems where subscribers retrieve messages proactively, there is no technical solution capable of ensuring subscribers receive messages in correct order.

SUMMARY

In one embodiment of the present invention, a method retrieves, in order, a plurality of specific topic-based messages in a distributed publish/subscribe system, the distributed publish/subscribe system comprising at least one message transit server. The method comprises: determining, by one or more processors, an order of a plurality of messages that are planned for retrieval, wherein the order describes a time order in which each message, from the plurality of messages, is planned for retrieval; recording, by one or more processors, message transit server sequence information for message transit servers where each of the plurality of messages are respectively located, wherein the message transit server sequence information describes an order, of the message transit servers, that corresponds to a determined time order of the plurality of messages; and retrieving, by one or more processors and in said order of the message transit servers, the plurality of messages from corresponding message transit servers using the message transit server sequence information.

In one embodiment of the present invention, a system retrieves, in order, a plurality of specific topic-based messages in a distributed publish/subscribe environment, the distributed publish/subscribe environment comprising at least one message transit server. The system comprises: order determining hardware means configured to determine an order of a plurality of messages that are planned for retrieval, wherein the order describes a time order in which each message, from the plurality of messages, is planned for retrieval; recording hardware means configured to record message transit server sequence information for message transit servers where each of the plurality of messages are respectively located, wherein the message transit server sequence information describes an order, of the message transit servers, that corresponds to a determined time order of the plurality of messages; and message retrieving hardware means configured to retrieve in said order of the message transit servers, the plurality of messages from corresponding message transit servers using the message transit server sequence information.

In one embodiment of the present invention, a computer program product retrieves, in order, a plurality of specific topic-based messages in a distributed publish/subscribe system, the distributed publish/subscribe system comprising at least one message transit server, the computer program product comprising a computer readable storage medium having program code embodied therewith, the program code readable and executable by a processor to perform a method comprising: determining an order of a plurality of messages that are planned for retrieval, wherein the order describes a time order in which each message, from the plurality of messages, is planned for retrieval; recording message transit server sequence information for message transit servers where each of the plurality of messages are respectively located, wherein the message transit server sequence information describes an order, of the message transit servers, that corresponds to a determined time order of the plurality of messages; and retrieving, in said order of the message transit servers, the plurality of messages from corresponding message transit servers using the message transit server sequence information.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, one or more aspects of the present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
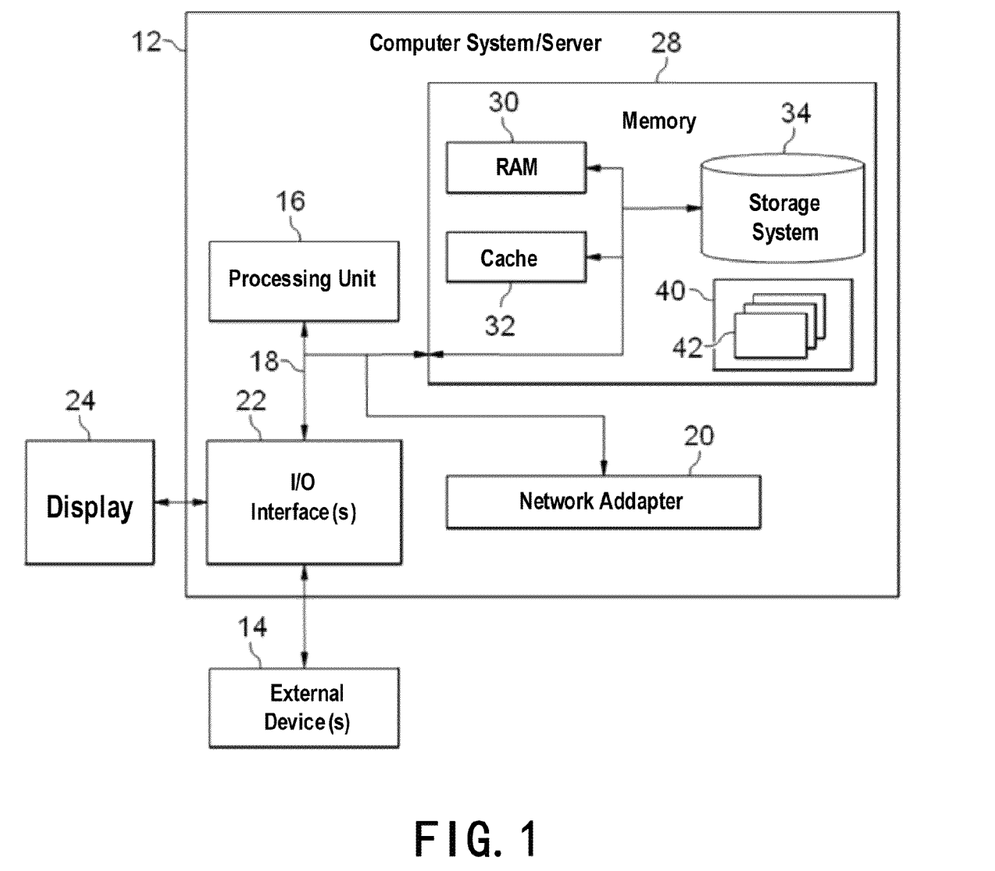
FIG. 1 illustrates an exemplary computer system 100 which is applicable to implement the embodiments of the present invention.

Referring now to FIG. 1, in which an exemplary computer system/server 12 which is applicable to implement the embodiments of the present invention is illustrated. Computer system/server 12 is only illustrative and is not intended to suggest any limitation as to the scope of use or functionality of embodiments of the invention described herein.

As illustrated in FIG. 1, computer system/server 12 is illustrated in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not illustrated and typically called a "hard drive"). Although not illustrated, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
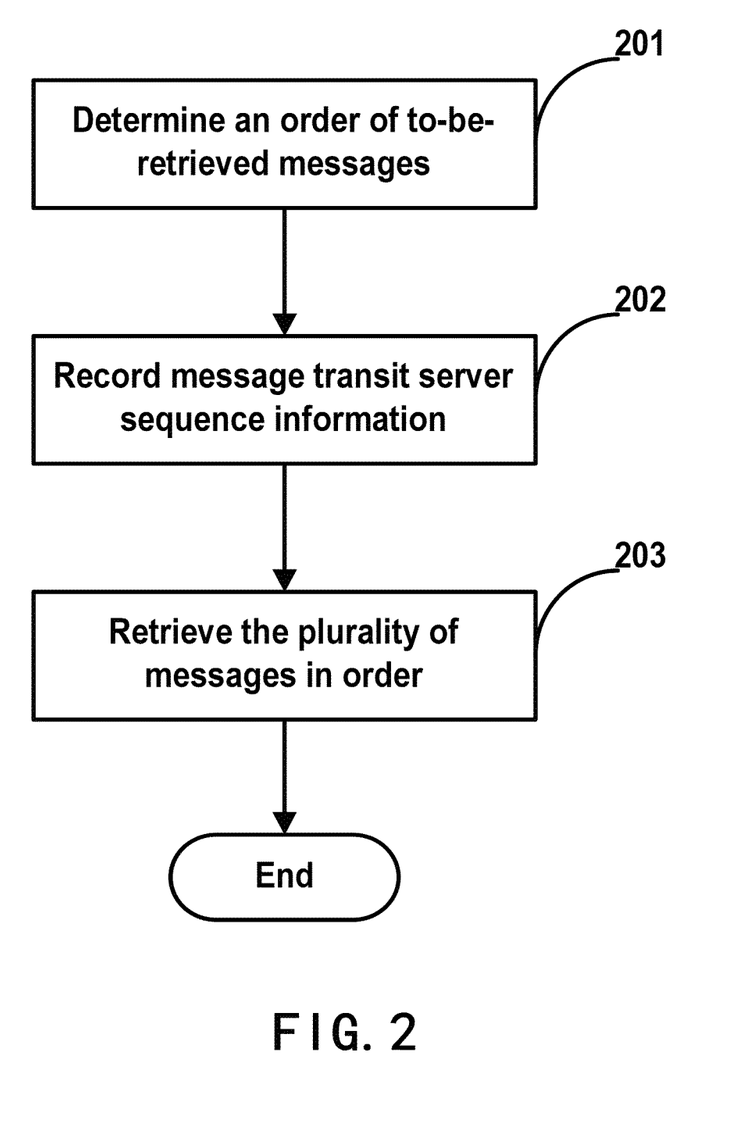
FIG. 2 illustrates a flowchart of a method for retrieving in order a plurality of specific topic-based messages in a distributed publish/subscribe system according to one embodiment of the present invention.

Now, FIG. 2 will be depicted. This figure illustrates a flowchart of a method for retrieving in order a plurality of specific topic-based messages in a distributed publish/subscribe system. The method illustrated in FIG. 2 starts from step 201. In step 201, an order for a plurality of to-be-retrieved messages is determined. First of all, it should be pointed out that the plurality of messages mentioned here are a plurality of messages based on the same topic, e.g. a plurality of messages published based on such a topic as live broadcasts of the same football match. Those skilled in the art should understand that in a publish/subscribe system, a publisher and subscribers have defined a rule of ordering messages on this topic based on a pre-agreement. For example, in a stock quotations publish system, a publisher and subscribers have agreed in advance that stock quotations are published every minute, quotations are ordered by minute, and timestamps may be attached to stock quotations published every minute for identification. Therefore, in step 201 the order of a plurality of to-be-retrieved messages may be determined. That is, subscribers to stock quotations know that stock quotations at the 1st minute are followed by stock quotations at the 2nd minute, and so on and so forth. Now there is a problem that since stock quotations at each minute may be published to uncertain message transit servers, whereas subscribers do not know on which transit server each stock quotation is located, the orderly retrieval of stock quotations becomes impossible. Moreover, message transit servers have no idea about the message order rule agreed between the publisher and subscribers; and in publish/subscribe systems in the mode of subscribers retrieving messages proactively, message transit servers are not responsible for pushing messages.

Next, the method illustrated in FIG. 2 proceeds to step 202 in which message transit servers at which the plurality of messages are located are recorded in message transit server sequence information, the order of the message transit servers in the message transit server sequence information corresponding to the determined order of the plurality of messages. According to one embodiment of the present invention, the message transit server sequence information is stored in a certain message transit server. According to another embodiment of the present invention, the message transit server sequence information is stored at a location that is independent of all message transit servers, subscribers and publishers, but can be communicatively coupled to subscribers. According to one embodiment of the present invention, the message transit server sequence information may take the form of a data sheet or take the form of any other data file and metadata information. As described above, since it is uncertain to which message transit server each message of the plurality of messages is published, it is necessary to record, in the message transit server sequence information, to which message transit server each message is published, such that the subscribers can directly retrieve the message from a corresponding message transit server. For example, suppose based on a specific topic, i.e. Topic 1, five messages are published in an order of M1, M2, M3, M4 and M5, among which M1 and M5 are published to message transit servers B1, M2 to message transit server B3, M3 to message transit server B2, and M4 to message transit server B0. Then, an example of the message transit server sequence information as completely recorded in step 202 may be:

Topic 1: B1, B3, B2, B0, B1

It can be seen that each location in the sequence information corresponds in order to a message transit server where each message is located. In this manner, by reading the sequence information, subscribers can retrieve in order the plurality of messages based on Topic 1 from corresponding message transit servers.

It should be stressed that the message transit server sequence information is a dynamically updated process and is not completed all at once. Whenever a new message under this topic is published, the message transit server sequence information needs to be dynamically updated (in predetermined time intervals). Furthermore, suppose the moment when message M3 is received by B2 is delayed due to network latency. As a result, message M4 is received by B0 whereas message M3 that should have been received earlier is not received by B2 yet, so the message transit server sequence information might become:

Topic 1: B1, B3, B0, B1

That is, content at a location corresponding to message M3 is empty. In this case, once subscribers read the sequence information and find that the location of M3 is empty, even if message transit servers corresponding to M4 and M5 have been determined, subscribers will not retrieve M4 and M5 from B0 and B1 but wait (or query and record proactively; please refer to the following description) for a transit server corresponding to message M3 to be determined. In this manner, it is ensured that messages are retrieved in proper order.

According to one embodiment of the present invention, the recording, in message transit server sequence information, message transit servers at which the plurality of messages are located, respectively, comprises: querying identifiers of the message transit servers where the plurality of messages are located; and recording the queried identifiers at corresponding locations in the message transit server sequence information. According to one preferred embodiment, the "querying" mentioned here refers to for each message, inquiring various message transit servers until determining that the message is saved on a certain message transit server, and then recording an identifier of the message transit server at a corresponding location in the message transit server sequence information. It should be pointed out that the step of "querying" is not indispensable; it is highly possible that when a message is published to a message transit server, the message transit server automatically records an identifier of the message and its correspondence with an identifier of a corresponding message transit server, without querying again.

According to one embodiment of the present invention, for each message of the plurality of messages, a subscriber responsible for recording, in the message transit server sequence information, a message transit server where the each message is located, is determined from among a plurality of subscribers. Since each subscriber's requirements on the receiving order of messages based on the same topic are generally consistent, once a subscriber learns a message transit server where a certain message is located and records an identifier of the message transit server at a corresponding location in the message transit server sequence information, all of other subscribers can directly use the message transit server sequence information to retrieve messages in proper order, without querying again. Therefore, considerable query time and wait time can be saved. That is, other subscribers who are not determined as responsible subscribers directly use the current message transit server sequence information to retrieve in order one or more of the plurality of messages from corresponding message transit server(s).

According to one embodiment of the present invention, a subscriber responsible for recording, in the message transit server sequence information, a message transit server where the each message is located, is determined using lock contention. If several subscribers each submit a request for query or recording, it should be ensured that only one subscriber has permission to update the message transit server sequence information; otherwise, a fault may occur. Lock contention might comprise optimistic locking or pessimistic locking. As lock contention belongs to the prior art, details thereof are omitted here.

Further it should be stressed that step 202 is essential to each message of the plurality of messages but might not be essential to each subscriber. This is because once a subscriber records relevant information in the message transit server sequence information, other subscribers do not need to record the information again.

Then the method illustrated in FIG. 2 proceeds to step 203 in which the plurality of messages are retrieved in order from corresponding message transit servers using the message transit server sequence information. The operation of step 203 may be easily understood from the above-presented example of message transit server sequence information.

Figure 3:
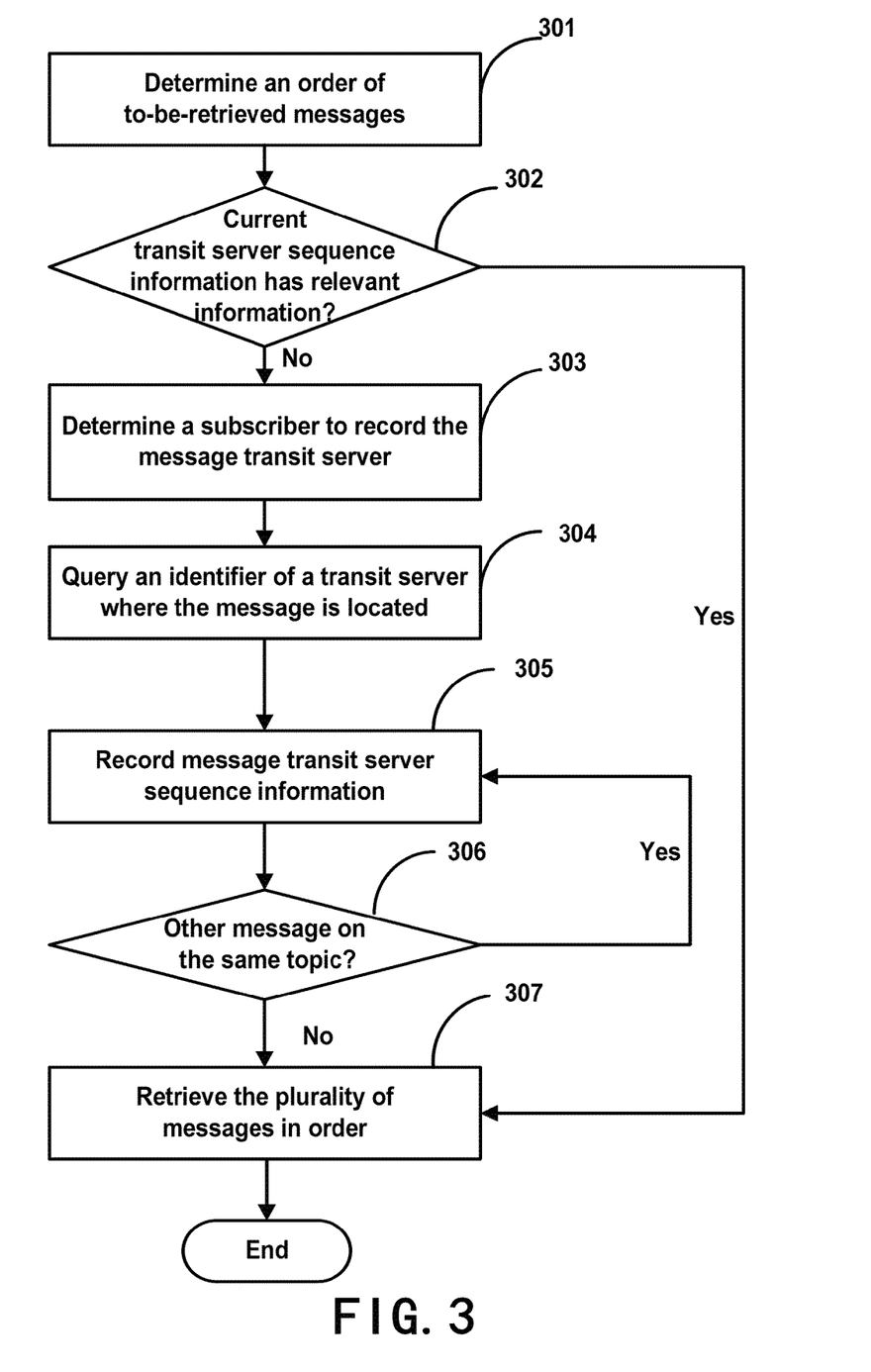
FIG. 3 illustrates a flowchart of a method for retrieving in order a plurality of specific topic-based messages in a distributed publish/subscribe system according to another embodiment of the present invention.

FIG. 3 illustrates a flowchart of a method for retrieving in order a plurality of specific topic-based messages in a distributed publish/subscribe system according to another embodiment of the present invention. Step 301 corresponds to step 201 in FIG. 2 and thus is not detailed here.

In step 302, it is determined whether or not current message transit server sequence information contains a message transit server corresponding to a specific message of the plurality of messages. For example, a certain subscriber has retrieved messages M1, M2 and M3 and now wants to retrieve message M4, and then the subscriber may determine whether or not the message transit server corresponding to the M4 has been recorded in the message transit server sequence information. If so, then the method proceeds to step 307 (corresponding to step 203 in FIG. 2) in which the specific message is retrieved from the corresponding message transit server in order using the current message transit server sequence information. If not, then the method proceeds to step 303 in which a subscriber responsible for recording, in the message transit server sequence information, a message transit server where the each message is located, is determined. Technical contents on determining the subscriber have been described above and are not detailed here.

Next, the method illustrated in FIG. 3 proceeds to step 304 in which an identifier of the message transit server where the message is located is queried, and to step 305 in which the queried identifier is recorded at a corresponding location in the message transit server sequence information. Steps 304 and 305 have also been described in the above depiction of FIG. 2 and thus are not detailed here.

Afterwards, the method illustrated in FIG. 3 proceeds to step 306 in which it is determined whether or not other messages based on the same topic still exist in the queried message transit server. If so, then the method proceeds to step 305 in which the message transit server is recorded at a location corresponding to the other message in the sequence information. If not, then the method proceeds to step 307 in which the plurality of messages are retrieved in order from corresponding message transit servers using the message transit server sequence information. For example, when querying a message transit server where message M1 is located, if it is found that besides M1 there is still M5 on the message transit server B1, then B1 is directly recorded at a location corresponding to message M5 in the message transit server sequence information, thereby skipping the operation of querying a message transit server where M5 is located. Of course, those skilled in the art should understand that step 306 is not an essential step, but merely an optimized scheme. It is entirely feasible to query and record, one by one, message transit servers where various messages are located.

Figure 4:
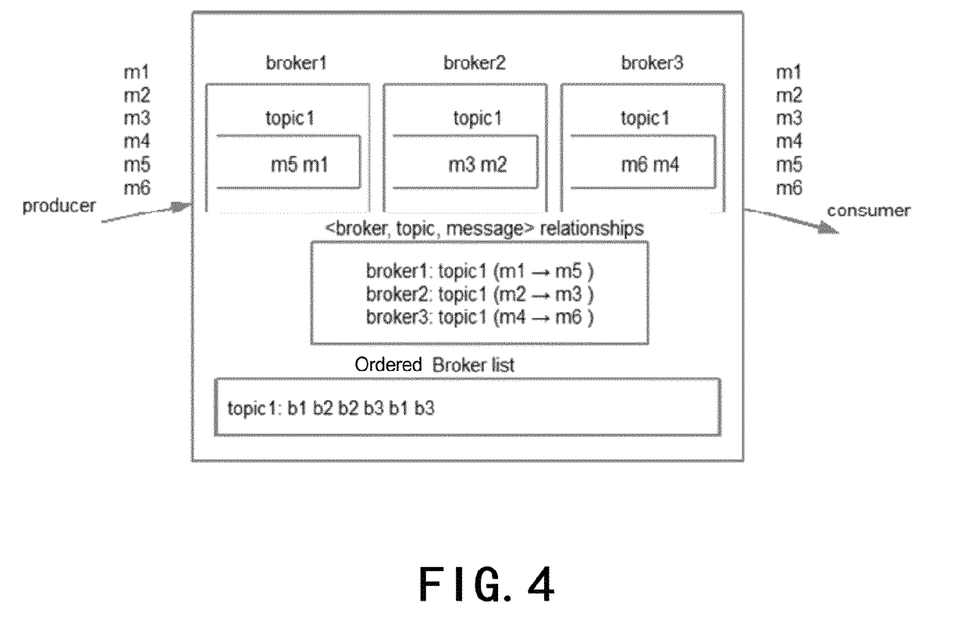
FIG. 4 illustrates an architecture diagram of an exemplary distributed publish/subscribe system according to one embodiment of the present invention.

FIG. 4 illustrates an architecture diagram of an exemplary distributed publish/subscribe system according to one embodiment of the present invention. At the left side of FIG. 4 there are illustrated six messages based on topic 1, i.e. m1-m6 published by the producer. In the middle box there are illustrated three message transit servers in a distributed environment, i.e. broker 1, broker 2 and broker 3, among which messages m1 and m5 are located at broker 1, m2 and m3 at broker 2, and m4 and m6 at broker 3. At the right side of FIG. 4 there are illustrated six messages received by the consumer. At the lower portion of the middle box there is illustrated final message transit server sequence information (Broker list). The center of the middle box illustrates a triplet data structure about broker, topic and message, which triplet serves to record which messages are stored on each broker with respect to each specific topic so that the consumer can directly update the message transit server sequence information according to records of the triplet data structure. According to one embodiment of the present invention, the triplet data structure may be recorded and updated by a message transit server (which will not levy too much burden on the message transit server), the consumer or the producer. It should be stressed that the triplet data structure is not essential. Like the above depiction of FIGS. 2 and 3, the object of the present invention can be achieved without the triplet data structure or a similar data structure for recording intermediate information.

Further, it should be stressed that the concept of the present invention may also be achieved by a publisher that queries and records message transit server sequence information, so long as subscribers finally proactively retrieve various messages in proper order using the message transit server sequence information.

Figure 5:
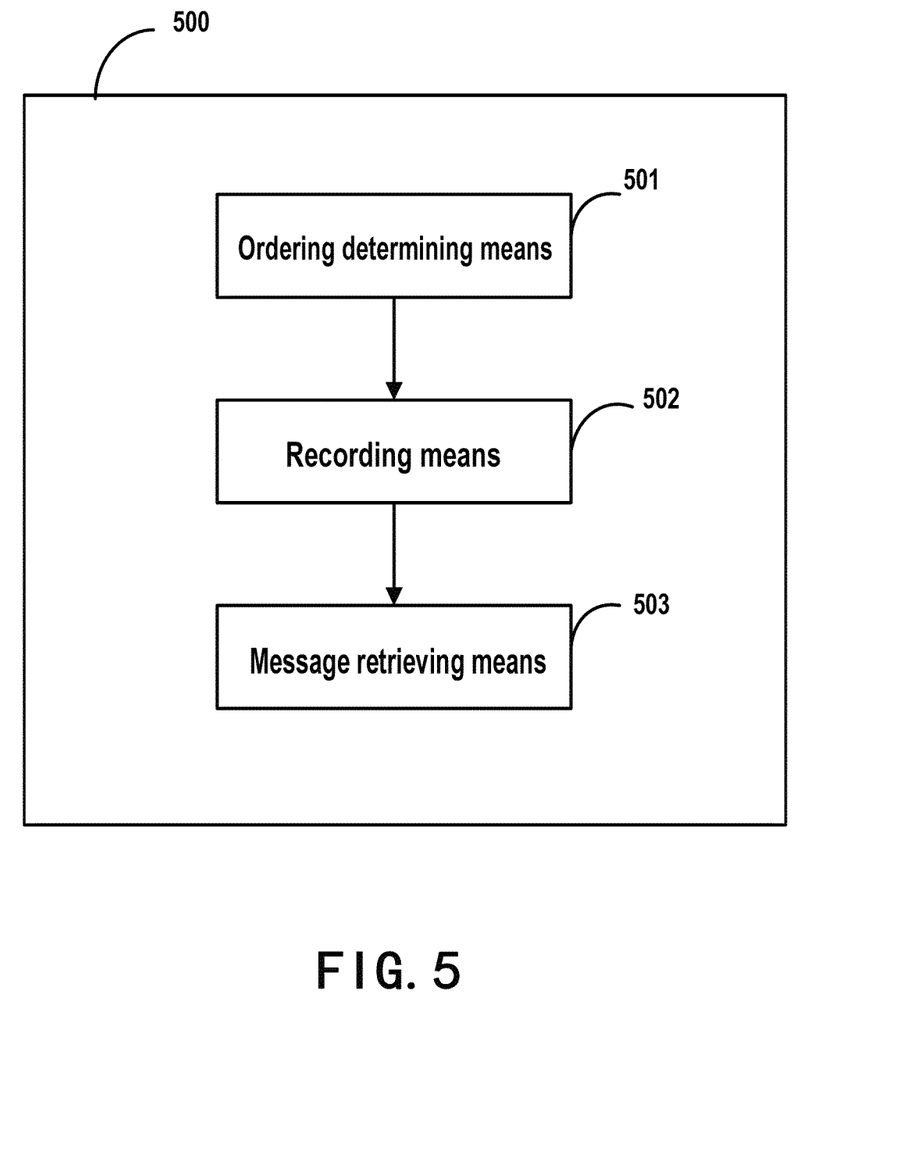
FIG. 5 illustrates a block diagram of a system for retrieving a plurality of specific topic-based messages in a distributed publish/subscribe system according to one embodiment of the present invention.

FIG. 5 illustrates a block diagram of a system for retrieving in order a plurality of specific topic-based messages in a distributed publish/subscribe system. The system illustrated in FIG. 5 is represented by a system 500 as a whole. Specifically, system 500 comprises: order determining means 501 configured to determine an ordering of a plurality of messages to be retrieved; recording means 502 configured to record, in message transit server sequence information, message transit servers where the plurality of messages are located, respectively, the order of message transit servers in the message transit server sequence information corresponding to the determined order of the plurality of messages; and message retrieving means 503 configured to retrieve in order the plurality of messages from corresponding message transit servers using the message transit server sequence information. Those skilled in the art should understand that means 501-503 of system 500 respectively correspond to steps 201-203 in FIG. 2 and thus are not detailed here.

It is an objective of the present invention to provide a method and system for retrieving messages in order in a publish/subscribe system in a distributed computer network environment.

According to one aspect of the present invention, there is provided a method and/or computer program product for retrieving in order a plurality of specific topic-based messages in a distributed publish/subscribe system, the distributed publish/subscribe system comprising at least one message transit server, the method comprising: determining an order of a plurality of to-be-retrieved messages; recording, in message transit server sequence information, message transit servers where the plurality of messages are located, respectively, an order of message transit servers in the message transit server sequence information corresponding to the determined order of the plurality of messages; and retrieving in order the plurality of messages from corresponding message transit servers using the message transit server sequence information.

According to another aspect of the present invention, there is provided a system for retrieving in order a plurality of specific topic-based messages in a distributed publish/subscribe environment, the distributed publish/subscribe environment comprising at least one message transit server, the system comprising: order determining means configured to determine an order of a plurality of to-be-retrieved messages; recording means configured to record, in message transit server sequence information, message transit servers where the plurality of messages are located, respectively, an order of message transit servers in the message transit server sequence information corresponding to the determined order of the plurality of messages; and message retrieving means configured to retrieve in order the plurality of messages from corresponding message transit servers using the message transit server sequence information.

By means of the method or system provided by the present invention, in a publish/subscribe system in the mode of subscribers retrieving messages proactively, all subscribers may retrieve messages in a predetermined order of messages without levying the additional burden on servers, and in the meanwhile, as many subscribers as possible may directly retrieve messages in order without a need of repetitively executing operations such as query and recording.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for retrieving, in order, a plurality of specific topic-based messages in a distributed publish/subscribe system, the distributed publish/subscribe system comprising at least one message transit server, the method comprising:
   determining, by one or more processors, an order of a plurality of messages that are planned for retrieval, wherein the order describes a time order in which each message, from the plurality of messages, is planned for retrieval compared to other messages from the plurality of messages;
   recording, by one or more processors, message transit server sequence information for message transit servers where each of the plurality of messages is respectively located, wherein the message transit server sequence information describes an order, of the message transit servers, that corresponds to a determined time order of the plurality of messages; and
   retrieving, by one or more processors and in said order of the message transit servers, the plurality of messages from corresponding message transit servers using the message transit server sequence information.

2. The method according to claim 1, wherein the recording, in the message transit server sequence information, of the order of the message transit servers where the plurality of messages are respectively located comprises:
   querying, by one or more processors, identifiers of message transit servers where the plurality of messages are respectively located; and
   recording, by one or more processors, queried identifiers at respective and corresponding locations in the message transit server sequence information.

3. The method according to claim 1, further comprising:
   for each message of the plurality of messages, determining, from each of a plurality of subscribers, a subscriber responsible for recording, in the message transit server sequence information, an identity of a message transit server where said each message is located.

4. The method according to claim 3, wherein the retrieving, in order, the plurality of messages from corresponding message transit servers using the message transit server sequence information comprises:
   directly using, by other subscribers from the plurality of subscribers but who are not predefined as responsible subscribers who are responsible for recording where each message is located, current message transit server sequence information to retrieve, in order, one or more of the plurality of messages from one or more corresponding message transit servers.

5. The method according to claim 2, further comprising:
   determining, by one or more processors, whether or not an other message that is not from the plurality of messages, but is based on a same topic as the plurality of messages, exists in a queried message transit server;
   in response to a determination that the other message based on the same topic as the plurality of messages exists in the queried message transit server, recording in the message transit server sequence information, by one or more processors, a location of a queried message transit server at a location corresponding to the other message.

6. The method according to claim 3, further comprising:
   using, by one or more processors, lock contention to determine, for each message of the plurality of messages, the subscriber responsible for recording in the message transit server sequence information the message transit server where said each message is located.

7. The method according to claim 1, further comprising:
   determining, by one or more processors, whether or not a current message transit server sequence information contains a message transit server corresponding to a specific message of the plurality of messages; and
   in response to determining that the current message transmit server sequence information does not contain the message transit server corresponding to the specific message of the plurality of messages, recording, by one or more processors, in the message transit server sequence information the message transit server where the specific message is located;
   and wherein the retrieving, in order, the plurality of messages from corresponding message transit servers using the message transit server sequence information comprises:
   in response to determining that the current message transmit server sequence information does contain the message transit server corresponding to the specific message of the plurality of messages, retrieving, by one or more processors, in order the specific message from a corresponding message transit server using the current message transit server sequence information.

8. A system for retrieving, in order, a plurality of specific topic-based messages in a distributed publish/subscribe environment, the distributed publish/subscribe environment comprising at least one message transit server, the system comprising:
   order determining hardware means configured to determine an order of a plurality of messages that are planned for retrieval, wherein the order describes a time order in which each message, from the plurality of messages, is planned for retrieval compared to other messages from the plurality of messages;
   recording hardware means configured to record message transit server sequence information for message transit servers where each of the plurality of messages is respectively located, wherein the message transit server sequence information describes an order, of the message transit servers, that corresponds to a determined time order of the plurality of messages; and
   message retrieving hardware means configured to retrieve in said order of the message transit servers, the plurality of messages from corresponding message transit servers using the message transit server sequence information.

9. The system according to claim 8, wherein the recording means is configured to:
   query identifiers of message transit servers where the plurality of messages are respectively located; and
   record queried identifiers at respective and corresponding locations in the message transit server sequence information.

10. The system according to claim 8, further comprising:
    subscriber determining means configured to, for each message of the plurality of messages, determine, from each of a plurality of subscribers, a subscriber responsible for recording, in the message transit server sequence information, an identity of a message transit server where said each message is located.

11. The system according to claim 10, wherein the message retrieving means is further configured to:
    directly use, by other subscribers from the plurality of subscribers but who are not predefined as responsible subscribers who are responsible for recording where each message is located, current message transit server sequence information to retrieve, in order, one or more of the plurality of messages from one or more corresponding message transit servers.

12. The system according to claim 9, further comprising:
first determining means configured to:
   determine whether or not an other message that is not from the plurality of messages, but is based on a same topic as the plurality of messages, exists in a queried message transit server;
   in response to a determination that the other message based on the same topic as the plurality of messages exists in the queried message transit server, recording in the message transit server sequence information a location of a queried message transit server at a location corresponding to the other message.

13. The system according to claim 10, wherein a subscriber responsible for recording, in the message transit server sequence information, a message transit server where the each message is located, is determined using lock contention.

14. The system according to claim 8, wherein the recording means is further configured to:
   determine whether or not current message transit server sequence information contains a message transit server corresponding to a specific message of the plurality of messages; and
   in response to a determination result being no, record in the message transit server sequence information the message transit server where the specific message is located;
and wherein the message retrieving means is further configured to:
   in response to a determination result being yes, retrieve, in order, the specific message from a corresponding message transit server using the current message transit server sequence information.

15. A computer program product for retrieving, in order, a plurality of specific topic-based messages in a distributed publish/subscribe system, the distributed publish/subscribe system comprising at least one message transit server, the computer program product comprising a computer readable storage medium having program code embodied therewith, the program code readable and executable by a processor to perform a method comprising:
   determining an order of a plurality of messages that are planned for retrieval, wherein the order describes a time order in which each message, from the plurality of messages, is planned for retrieval compared to other messages from the plurality of messages;
   recording message transit server sequence information for message transit servers where each of the plurality of messages is respectively located, wherein the message transit server sequence information describes an order, of the message transit servers, that corresponds to a determined time order of the plurality of messages; and
   retrieving, in said order of the message transit servers, the plurality of messages from corresponding message transit servers using the message transit server sequence information.

16. The computer program product according to claim 15, wherein the recording, in the message transit server sequence information, of the order of the message transit servers where the plurality of messages are respectively located comprises:
   querying identifiers of message transit servers where the plurality of messages are respectively located; and
   recording queried identifiers at respective and corresponding locations in the message transit server sequence information.

17. The computer program product of claim 15, wherein the method further comprises:
   for each message of the plurality of messages, determining, from each of a plurality of subscribers, a subscriber responsible for recording, in the message transit server sequence information, an identity of a message transit server where said each message is located.

18. The computer program product of claim 17, wherein the retrieving, in order, the plurality of messages from corresponding message transit servers using the message transit server sequence information comprises:
   directly using, by other subscribers from the plurality of subscribers but who are not predefined as responsible subscribers who are responsible for recording where each message is located, current message transit server sequence information to retrieve, in order, one or more of the plurality of messages from one or more corresponding message transit servers.

19. The computer program product of claim 16, wherein the method further comprises:
   determining whether or not an other message that is not from the plurality of messages, but is based on a same topic as the plurality of messages, exists in a queried message transit server;
   in response to a determination that the other message based on the same topic as the plurality of messages exists in the queried message transit server, recording, in the message transit server sequence information, a location of a queried message transit server at a location corresponding to the other message.

20. The computer program product of claim 17, wherein the method further comprises: using lock contention to determine, for each message of the plurality of messages, the subscriber responsible for recording in the message transit server sequence information the message transit server where said each message is located.

* * * * *